(12) United States Patent
Lee et al.

(10) Patent No.: US 7,158,557 B2
(45) Date of Patent: Jan. 2, 2007

(54) CHANNEL ESTIMATION APPARATUS AND METHOD

(75) Inventors: Young-Yong Lee, Kwang-Yang (KR);
Kwang-Seog Bae, Suwon (KR);
Jae-Min Ahn, Yong-In (KR);
Min-Joong Rim, Seoul (KR);
Hyung-Jin Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1039 days.

(21) Appl. No.: 10/132,800

(22) Filed: Apr. 25, 2002

(65) Prior Publication Data

US 2003/0072355 A1 Apr. 17, 2003

(30) Foreign Application Priority Data

Oct. 12, 2001 (KR) .................. 10-2001-0063146

(51) Int. Cl.
*H04B 1/707* (2006.01)
(52) U.S. Cl. .................. 375/147; 455/9; 370/342
(58) Field of Classification Search ........... 375/147, 375/327, 341, 252, 335, 342, 491; 455/9, 455/423, 67.11, 67.13
See application file for complete search history.

(56) References Cited

U.S. PATENT DOCUMENTS 6,493,329 B1 * 12/2002 Leung .................. 370/335

* cited by examiner

*Primary Examiner*—Kevin Kim
(74) *Attorney, Agent, or Firm*—The Farrell Law Firm

(57) ABSTRACT

There is provided a channel estimation apparatus for estimating a radio channel environment by multiplying a currently received bit signal of a pilot signal and previously received bit signals by weights, and summing the weighted currently received bit signal and the weighted previously received bit signals in a CDMA mobile communication system receiving the pilot signal comprised of a stream of bits having given bit values, and a power control signal comprised of power control bits. In the channel estimation, a predictor predicts a next bit signal succeeding the currently received bit signal, multiplies the predicted next bit signal by a weight, and generates a weighted next bit signal. A summer sums the weighted next bit signal from the predictor, the weighted currently received bit signal and the previously received bit signals.

19 Claims, 6 Drawing Sheets

CHANNEL ESTIMATION APPARATUS AND METHOD

PRIORITY

This application claims priority to an application entitled "Channel Estimation Apparatus and Method" filed in the Korean Industrial Property Office on Oct. 12, 2001 and assigned Serial No. 2001-63146, the contents of which are hereby incorporated by reference.

BACKGROUND OF THE INVENTION

1. Field of the Invention

The present invention relates generally to a channel estimation apparatus and method in a CDMA (Code Division Multiple Access) mobile communication system, and in particular, to an apparatus and method for performing channel estimation using power control bits in a CDMA mobile communication system.

2. Description of the Related Art

Generally, in order to perform communication, a mobile communication system establishes a channel and transmits/receives data over the channel. Transmission power of the channel is determined depending on a relative position of a mobile terminal to the base station. That is, a mobile terminal situated in a place far away from a base station must transmit data at higher power than a mobile station situated in a place relatively close to the base station, so that the base station can receive the transmitted data correctly. Controlling the transmission power from the base station to the mobile terminal is called "forward link power control". Controlling transmission power from the mobile terminal to the base station is called "reverse link power control". In the following description, the term "forward" as used herein refers to a direction from the base station to the mobile terminal, while the term "reverse" refers to a direction from the mobile terminal to the base station. In addition, the term "forward link" refers to a link established to transmit data from the base station to the mobile terminal, while the term "reverse link" refers to a link established to transmit data from the mobile terminal to the base station.

The base station detects a state of a channel received from the mobile terminal in order to perform the reverse link power control. That is, the base station detects a state of the channel over which a received signal has been transmitted, in order to perform coherent detection. Information on the channel state can be provided through a pilot channel. However, the existing mobile communication system performs only the forward link power control.

However, IMT-2000 system as a CDMA-2000 or WCDMA system, is designed to be able to use pilot signals even in the reverse link. Therefore, it is possible for the base station to perform coherent detection, thus contributing to smooth data transmission over the reverse link and an improvement in system capacity.

In addition, a channel estimator detects the channel state using the data received over the pilot channel. By doing so, the channel estimator estimates distortion of the signal. Further, the channel estimator can reduce distortion of information by applying the channel-estimated value to a received signal.

In a CDMA (Code Division Multiple Access) cellular system having limited cell capacity due to interference, the transmission power control is important to improving the overall cell capacity. In order to increase the cell capacity, the system may detect power control bits (PCBs) using a filter, and perform channel compensation based on the detected power control bits. For such a filter, various filters, especially, a WMSA (Weighted Multi-Slot Averaging) filter is used. In a mobile communication system receiving a pilot signal and a power control signal with power control bits among the bits in a predetermined period of a bit stream of the pilot signal, when the WMSA filter is used, time delay occurs in a channel compensation process using the power control bits, as illustrated in FIG. 6. Therefore, the channel estimator in the base station, using the WMSA filter, has low accuracy of closed-loop power control during analysis (discrimination) of power control bits on the reverse link.

SUMMARY OF THE INVENTION

It is, therefore, an object of the present invention to provide a channel compensation apparatus and method for preventing occurrence of time delay during discrimination of power control bits.

It is another object of the present invention to provide an apparatus and method for increasing accuracy of closed-loop power control in a mobile communication system.

It is yet another object of the present invention to provide an apparatus and method for improving channel compensation capability using predicted values during channel estimation.

To achieve the above and other objects, there is provided a channel estimation apparatus for estimating a radio channel environment by multiplying by weights a currently received bit signal of a pilot signal and previously received bit signals of the pilot signal, and summing the weighted currently received bit signal and the weighted previously received bit signals. In the CDMA mobile communication system receiving the pilot signal, the pilot signal is comprised of a stream of bits having given bit values, and a power control signal comprised of power control bits. In the channel estimation, a predictor predicts a next bit signal succeeding the currently received bit signal, multiplies the predicted next bit signal by a weight, and generates a weighted next bit signal. A summer sums the weighted next bit signal from the predictor, the weighted currently received bit signal and the previously received bit signals.

The channel estimation apparatus further comprises a delay to match a time delay of the output of the predictor to a time delay of the weighted next bit signal.

The channel estimation apparatus further comprises a power control bit extractor for extracting a power control bit from the power control signal containing the power control bits; a soft-decision processor for mixing a conjugated value for the weighted next bit signal from the predictor with the extracted power control bit, subjecting the mixed value to maximum ratio combining (MRC) and soft-deciding the MRC-combined value thereby to generate a soft-decided coefficient value; a switch for selecting one out of a first control signal for removing the power control bit and a second control signal for sampling an original signal according to the soft-decided coefficient value from the soft-decision processor or a state of a sample; and a mixer for mixing an output of the switch with the power control signal, and providing the mixed signal to the predictor.

The predictor comprises a first adder for calculating a difference between the currently received bit signal and an output signal of the predictor; first and second amplifiers for amplifying an output signal of the first adder with different weights; a first delay-adder for adding a current output of the first amplifier to a previous output of the first amplifier; a second adder for adding an output of the first delay-adder to an output of the second amplifier; a delay for delaying an output of the second adder for a predetermined time; and a second delay-adder for adding a current output of the delay to a previous output of the delay.

The soft-decision processor comprises a conjugator for calculating a conjugate value for the weighted next bit signal from the predictor; a mixer for mixing the power control bit with the calculated conjugate value from the conjugator; a real-part extractor for extracting a real part from an output of the mixer; a maximum rate decider for determining a maximum rate value among output values of the real-part extractor; and a soft-decision device for soft-deciding an output value of the maximum rate decider and outputting the soft-decided coefficient value.

To achieve the above and other objects, there is provided channel estimation method for estimating a radio channel environment by multiplying by weights a currently received bit signal of a pilot signal and previously received bit signals of the pilot signal, and summing the weighted currently received bit signal and the weighted previously received bit signals in a CDMA (Code Division Multiple Access) mobile communication system receiving the pilot signal, the pilot signal comprised of a stream of bits having given bit values, and a power control signal comprised of power control bits. The method comprises predicting a next bit signal succeeding the currently received bit signal, multiplying the predicted next bit signal by a weight, and generating a weighted next bit signal; and summing the weighted next bit signal, the weighted currently received bit signal and the previously received bit signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention proposes a channel estimator capable of estimating a channel state of a CDMA-2000 reverse link without time delay. The proposed channel estimator has a combined structure of a predictor and a decision-feedback FIR (Finite Impulse Response) filter. The predictor is comprised of an FIR filter or an IIR (Infinite Impulse Response) filter.

Further, the present invention proposes a new asymmetric direct discrimination channel estimator capable of compensating power control bits received over a CDMA-2000 reverse link without time delay. The proposed channel estimator has a combined structure of a predictor and a decision-feedback FIR filter. The predictor is comprised of an FIR filter or an IIR filter.

For the power control bits that do not permit time delay, the predictor performs coherent reception without time delay. However, for the data channel that gives priority to performance rather than time delay, the channel estimator adds an output of the predictor to an output of a multi-symbol averaging FIR filter, thereby improving reception performance.

Figure 1:
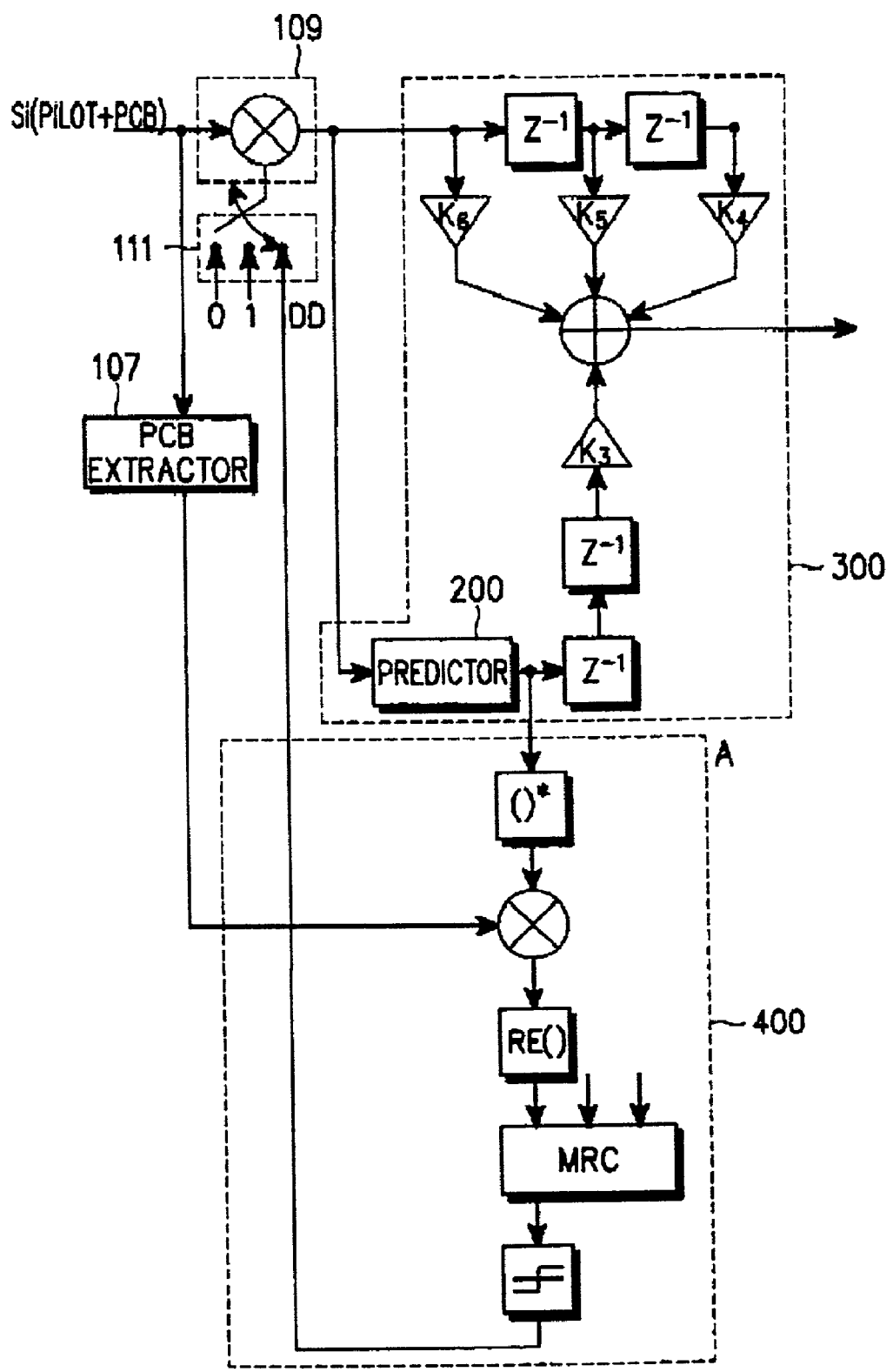
FIG. 1 illustrates a detailed structure of a channel estimator according to a preferred embodiment of the present invention.

FIG. 1 illustrates a detailed structure of a channel estimator according to a preferred embodiment of the present invention. The structure and operation of the channel estimator will be described in detail with reference to FIG. 1. Herein, FIG. 1 illustrates a case where input signals are a pilot signal and a power control signal, by way of an example. However, it is also understood that the same can be applied to a case where an input signal is just a pilot signal.

Referring to FIG. 1, a PCB (Power Control Bit) signal of a received pilot signal is subjected to predetermined signal processing in a preprocessing process (not shown) of distinguishing received signals and processing the distinguished signals. The preprocessed signal Si is divided into two signals: one signal is provided to a PCB extractor 107 and the other signal is provided to a first mixer 109. The first mixer 109 mixes the received preprocessed signal Si with an output of a switch 111, and provides its output to an FIR filter 300, which will be described later with reference to FIG. 3. The switch 111 selects one of '0', '1', and an output 'DD' of a soft-decision processor 400, and provides the selected signal to the first mixer 109. Here, the values '0', '1' and 'DD' used by the switch 111 are defined as follows. The value '0' is used to control a signal for removing PCB duration due to a decrease in accuracy of the soft-decision processor 400. The soft-decision processor 400 will be described later with reference to FIG. 4. Further, the value '1' is used to receive and sample the intact input signal. Finally, the value 'DD', a coefficient value determined by the soft-decision processor 400, has a value of '+1' or '−1'. The FIR filter 300 then calculates a multi-symbol average value. The FIR filter 300 includes a predictor 200 according to an embodiment of the present invention. The predictor 200 will be described later with reference to FIG. 2.

The above-described channel estimator is characterized by weighted-summing an output of the predictor 200, a currently received 3.2 KHz-pilot symbol, and 2 previously received 3.2 KHz-pilot symbols.

Figure 2:
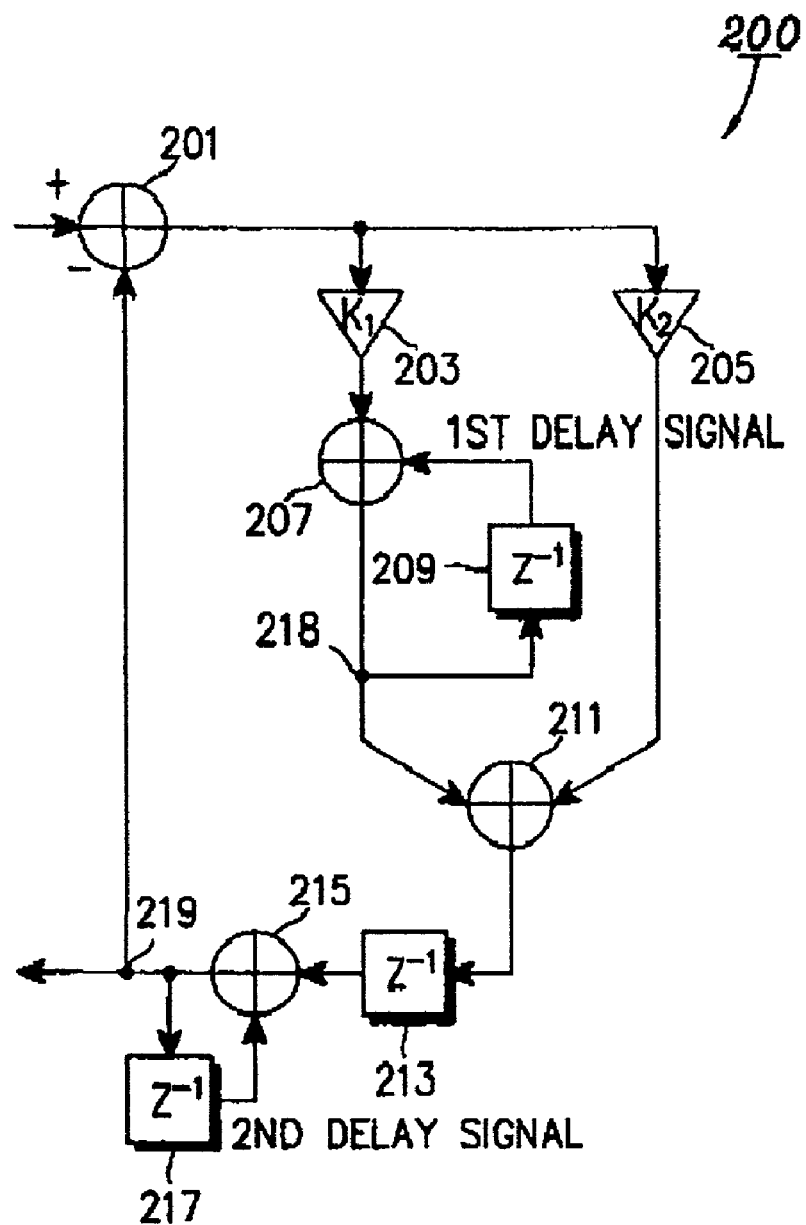
FIG. 2 illustrates a detailed structure of the predictor used in the channel estimator of FIG. 1.

FIG. 2 illustrates a detailed structure of the predictor 200 used in the channel estimator of FIG. 1. Referring to FIG. 2, the predictor 200 is comprised of an ITR filter, and coherently receives power control bits. Further, the predictor 200 also serves as a channel estimator. That is, the channel estimator illustrated in FIG. 1 weighted-sums an output of the predictor 200, a currently received 3.2 KHz-pilot symbol, and 2 previously received 3.2 KHz-pilot symbols.

A detailed description of the predictor 200 will be made with reference to a FIG. 2. An input signal to the predictor 200 is an output signal of the first mixer 109. The signal received from the first mixer 109 is added to an output signal of the predictor 200 by a first adder 201. The output signal of the first mixer 109 has a positive (+) value, and the output signal of the predictor 200 has a negative (−) value. That is, the first adder 201 calculates a difference between the two signals. The calculated signal difference output by adder 201 is divided into two signals, and then separately amplified by first and second amplifiers 203 and 205 having different gains $K_1$ and $K_2$, respectively.

The first amplifier 203 has a gain $K_1$, and the second amplifier 205 has a gain $K_2$. Therefore, the first and second amplifiers 203 and 205 amplify the signal difference by a gain $K_1$ and a gain $K_2$, respectively. The signal difference amplified by the first amplifier 203 is provided to a second adder 207. The second adder 207 adds the output signal of the first amplifier 203 to a signal obtained by delaying the output signal of the second adder 207 for a unit time by a first delay 209. Here, the output signal of the first delay 209 will be referred to as a first signal. Further, the output signal of the second adder 207 is added to an output signal of the second amplifier 205 by a third adder 211. An output signal of the third adder 211 is delayed for a unit time by a second delay 213. An output signal of the second delay 213 is provided to a fourth adder 215. The fourth adder 215 adds an output signal of the second delay 213 to a signal obtained by delaying the output signal of the fourth adder 215 for a unit time by a third delay 217. Here, the output signal of the third delay 217 will be referred to as a second signal. The output signal of the fourth adder 215 is divided into two signals, one of the two divided signals becomes an input signal of the first adder 201, and the other divided signal is the output of predictor 200.

The operation of the above-described predictor can be defined by Equations (1) and (2).

Equation (1) below defines the predictor operating in pilot bit duration (K %4=0, 1, 2, for 3.2 KHz-pilot symbol), and Equation (2) defines the predictor operating in PCB duration (K MOD 4=3 for 3.2 KHz-pilot symbol) except the pilot bits.

$$f_s[k+1]=f_s[k]+K_1(f[k]D_{PCB}-f[k])$$
$$f[k+1]=K_2(f[k]D_{PCB}-f[k])+f_s[k+1]+f[k] \quad \text{Equation (1)}$$

In Equation (1) f[k] presents an input sample signal to the predictor 200 in a $k^{th}$ bit duration, and k] f[k] represents the output signal of the predictor 200 at a junction 219 of FIG. 2. That is, f[k] is a signal used to generate the second signal. Further, $f_s[k]0$ represents a signal at a junction 218 of FIG. 2. That is, $f_s[k]$ represents a signal used to generate the first signal.

$$f_s[k+1]=f_s[k]+K_1(f[k]D_{PCB}-f[k])$$
$$f[k+1]=K_2(f[k]D_{PCB}-f[k])+f_s[k+1]+f[k] \quad \text{Equation (2)}$$

In Equation (2), a PCB symbol at the input node is compensated by multiplying a signal f[k] at the input node by $D_{PCB}$ thereby to restore its original signal. In Equation (2), $D_{PCB}$ represents soft-decided value for the remaining control bits except the pilot bits. A detailed description of the soft-decided value will be given later with reference to FIG. 4.

The predictor 200 coherently receives the power control bits (PCBs) without time delay. The predictor 200 used in the channel estimator is comprised of an IIR filter. The IIR filter-based predictor 200 may be differently constructed according to a reception rate (KHz) of the symbols received at the channel estimator.

Figure 4:
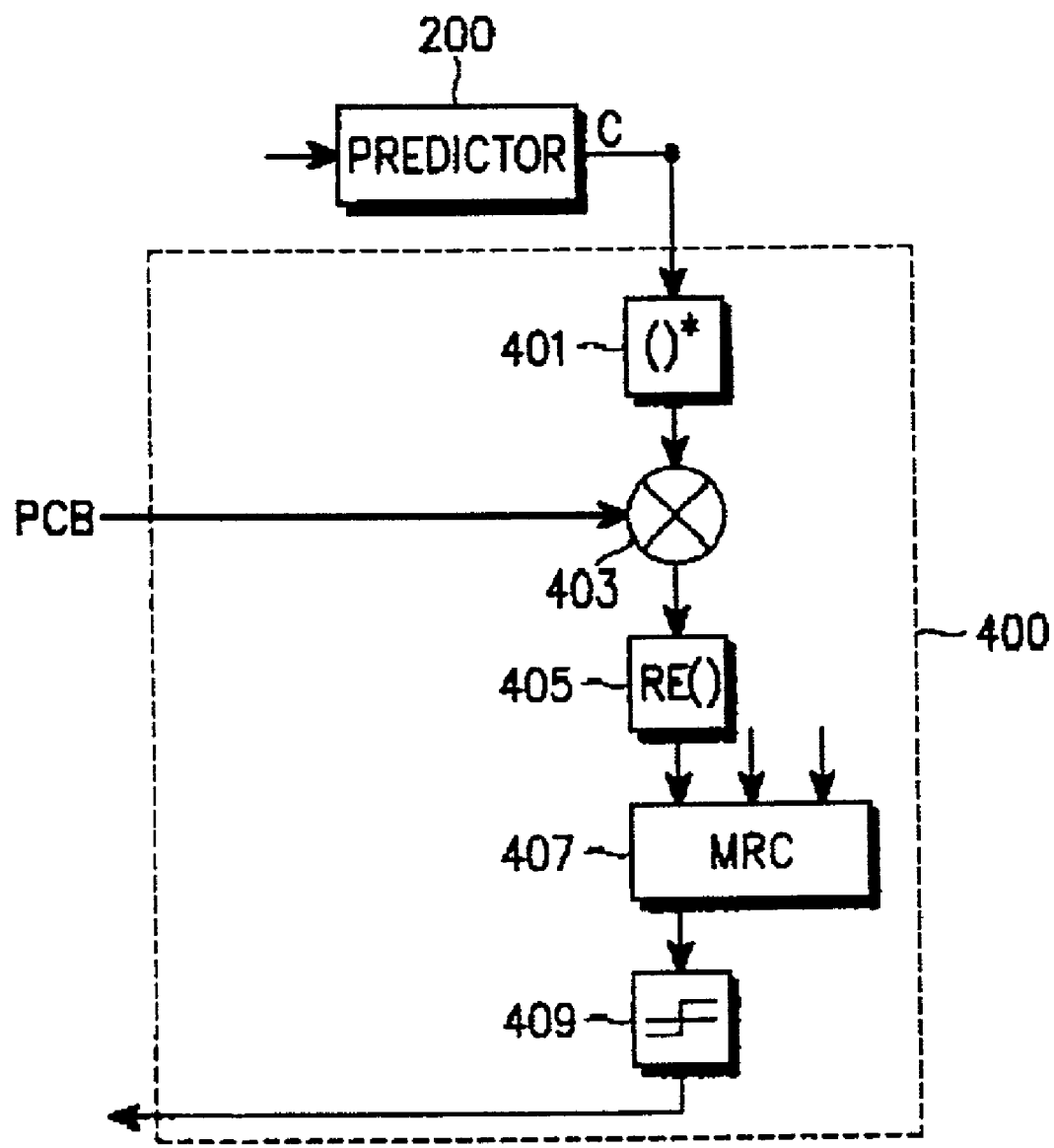
FIG. 4 illustrates a detailed structure of the soft-decision processor in the channel estimator of FIG. 1.

FIG. 4 illustrates a detailed structure of the soft-decision processor in the channel estimator of FIG. 1. The structure and operation of the soft-decision processor will be described in detail with reference to FIG. 4.

Referring to FIG. 4, an output signal of the predictor 200 described in conjunction with FIG. 2 is provided to a conjugator 401. The conjugator 401 is a block for generating a conjugate complex number. For example, upon receiving complex data 'a+bi', the conjugator 401 generates conjugate complex data 'a−bi'. The output of the conjugator 401 is provided to a mixer 403. The mixer 403 mixes a PCB signal output from a PCB extractor 107 of FIG. 1 with the output signal of the conjugator 401. The mixer 403 provides the mixed signal to a real-part (or real-number) extractor 405. The real-part extractor 405 extracts a real part from the output signal of the mixer 403, and provides its output to a maximum ratio combiner (MRC) 407. The MRC 407 compares weights of its input signals, and weighted-combines the input signals, thus to calculate a maximum gain. The MRC 407 provides the calculated maximum gain to a soft-decision device 409. The soft-decision device 409 calculates a soft-decided value for the output signal of the MRC 407. Therefore, the soft-decided value $D_{PCB}$ for the remaining control bits except the pilot bits is defined as $$V_{PCB} = \sum_{l=0}^{L-1} \text{Re}(f_l[k]\hat{f}^*[k]) \quad \text{Equation (3)}$$

$$D_{PCB} = \begin{cases} 1 & \text{if } V_{PCB} \geq 0 \\ -1 & \text{otherwise} \end{cases}$$

In Equation (3), L represents the number of multiple paths being subjected to maximum ratio combining (MRC), where l=0, 1, . . . , L−1. Further, Re(f$_l$[k]f*[k]) represents a real part of f$_l$[k]f*[k]. Therefore, $V_{PCB}$ means a sum of the signals received through the multiple paths.

The output signal of the soft-decision processor 400 of FIG. 4 is provided to the first mixer 109 through the switch 111 of FIG. 1. An output signal of the first mixer 109 is provided to the FIR filter 300 of FIG. 3.

Figure 3:
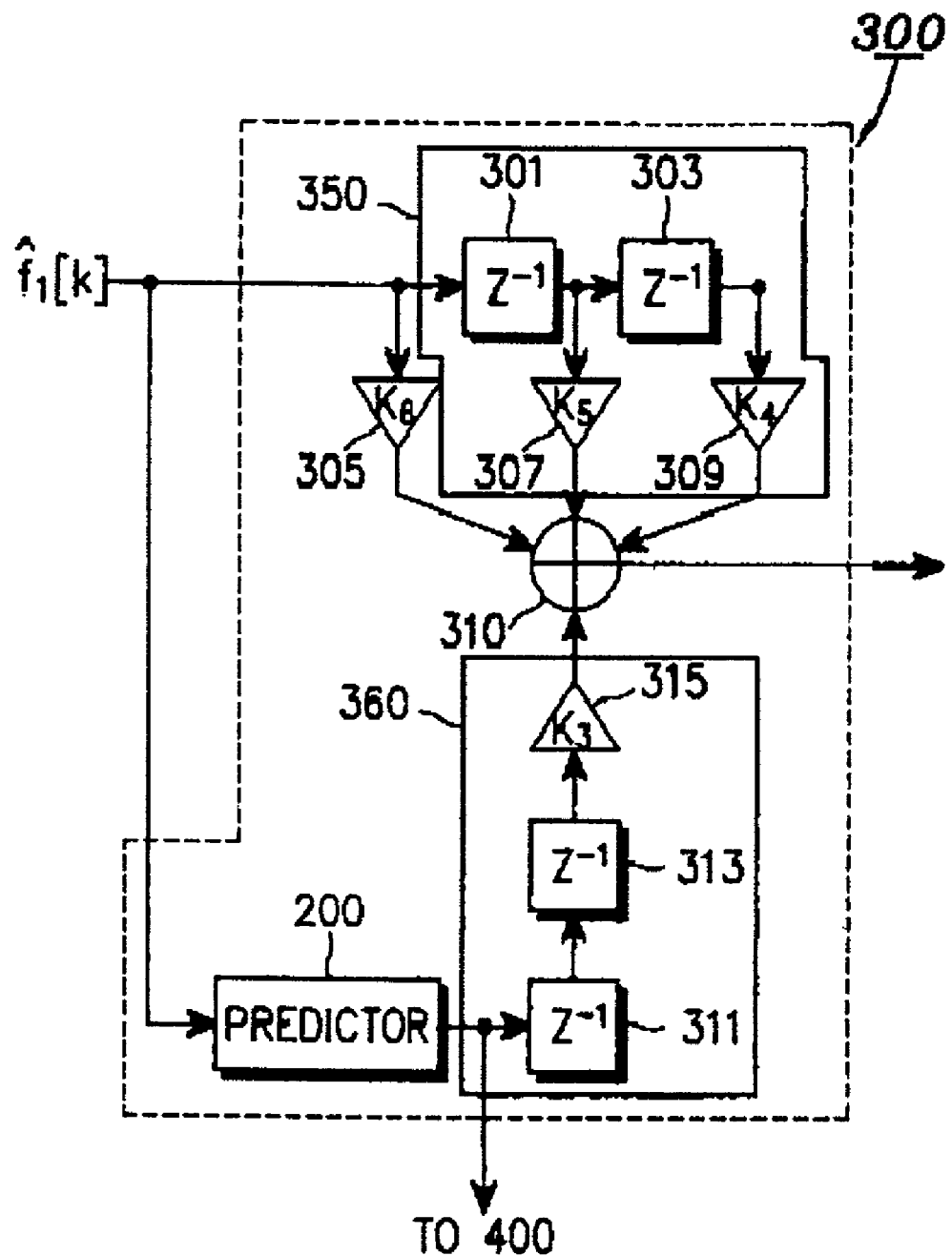
FIG. 3 illustrates a detailed structure of the multi-symbol averaging FIR filter in the channel estimator of FIG. 1.

FIG. 3 illustrates a detailed structure of the multi-symbol averaging FIR filter in the channel estimator of FIG. 1. The structure and operation of the multi-symbol averaging FIR filter will be described in detail with reference to FIG. 3.

Referring to FIG. 3, an input signal to the FIR filter 300 of FIG. 3 is defined as $$\hat{f}_l[k] = \begin{cases} f_l[k] & \text{for pilot symbols} \\ f_l[k]D_{PCB} & \text{for } PCB \text{ symbols} \end{cases} \quad \text{Equation (4)}$$

In Equation (4), $f_l[k]$ represents an input value corresponding to an $l^{th}$ path among the multiple paths, and $\hat{f}_l[k]$ represents a compensated value for the input value received through the $l^{th}$ path. The input signal defined by Equation (4) is provided in common to a first delay 301 and a first amplifier 305. The first amplifier 305 amplifies the input value and provides its output to a summer 310. Further, the signal delayed by the first delay 301 is provided to a second amplifier 307 and a second delay 303. The second amplifier 307 amplifies the signal delayed by the first delay 301, and provides its output to the summer 310. Further, the signal delayed by the second delay 303 is amplified by a third amplifier 309, and then provided to the summer 310. The first delay 301, the second delay 303, the second amplifier 307 and the third amplifier 309 constitute a first delay-amplifier 350.

Meanwhile, the input signal defined by Equation (4) is provided to the predictor 200, and then processed as described in conjunction with FIG. 2. The output signal of the predictor 200 is delayed by a third delay 311 for a unit time. The output signal of the third delay 311 is delayed again by a fourth delay 313 for the unit time, and then provided to a fourth amplifier 315. The fourth amplifier 315 amplifies the provided signal by a predetermined gain, and provides its output to the summer 310 The summer 310 then sums up its input signals. The third delay 311, the fourth delay 313 and the fourth amplifier 315 constitute a second delay-amplifier 360.

The first to fourth amplifiers 305, 307, 309 and 315 have different gains. The gains of the amplifiers 305, 307, 309 and 315 become weights for their input signals. Since the amplifiers 305, 307, 309 and 315 have the different gains, different weights are applied to the delayed signal, the predicted signal and the current signal.

The output signal of the multi-symbol averaging FIR filter 300 is defined as $$c_l[k-2] = K_6 \hat{f}_l[k] + K_5 \hat{f}_l[k-1] + K_4 \hat{f}_l[k-2] + K_3 f_l[k-2] \quad \text{Equation (5)}$$

In Equation (5), $\hat{f}_l$ combined with $K_3$ is the output signal of the predictor 200. The output signal of the multi-symbol averaging FIR filter 300 is compensated through the soft-decision processor 400 of FIG. 4. Also, in Equation (5), $c_l[k-2]$ represents an estimated value for a channel received through an $l^{th}$ path in a (k−2)-bit duration.

As described above, the combined signal of the output signal of the predictor 200 and the output signal of the FIR filter 300 is used in compensating the remaining control bits except for the information bits and the power control bits.

In addition, as mentioned above, the channel estimator is comprised of the FIR filter, and the FIR filter can be differently constructed depending on a reception rate (KHz) of the symbols received at the FIR filter. For example, for the pilot symbols received at a reception rate 15 KHz, the FIR filter can be comprised of 4 delays and 5 amplifiers.

Heretofore, the description has been made as to the outputs of the channel estimator and the predictor in a time domain. Next, reference will be made to a frequency response and an impulse response in a Z domain. A transfer function $H_P(z)$ of the predictor is defined as $$H_P(z) = \frac{(K_1 + K_2)z^{-1} - K_2 z^{-2}}{1 + (K_1 + K_2 - 2)z^{-1} + (1 - K_2)z^{-2}} \quad \text{Equation (6)}$$

Also, a transfer function $H_E(z)$ of the channel estimator is defined as $$H_E(z) = \frac{\left\{\begin{array}{c} K_6 + (K_5 + K_1 K_6 + K_2 K_6 - 2K_6)z^{-1} + \\ (K_4 + K_1 K_5 + K_2 K_5 - 2K_5 + K_6 - K_2 K_6)z^{-2} + \\ (K_1 K_3 + K_2 K_3 + K_1 K_4 + K_2 K_4 - 2K_4 + K_5 - K_2 K_5)z^{-3} + \\ (K_4 - K_2 K_4 - K_2 K_3)z^{-4} \end{array}\right\}}{1 + (K_1 + K_2 - 2)z^{-1} + (1 - K_2)z^{-2}} \quad \text{Equation (7)}$$

A Z-transform process for the $H_p$ is represented by Equations (8) to (10).

$$f_s z = f_s + K_1(f - \hat{f}) \quad \text{Equation (8)}$$
$$f_s z - f_s = K_1(f - \hat{f})$$
$$(z-1)f_s = K_1(f - \hat{f})$$
$$f_s = \frac{K_1(f - \hat{f})}{(z-1)}$$

$$\hat{f} z = K_2(f - \hat{f}) + f_s z + \hat{f} \quad \text{Equation (9)}$$
$$\hat{f} z + K_2 \hat{f} - \hat{f} = K_2 f + f_s z$$
$$\hat{f} z + K_2 \hat{f} - \hat{f} = K_2 f + \frac{K_1(f - \hat{f})}{(z-1)} z$$
$$\hat{f} z + K_2 \hat{f} - \hat{f} + \frac{K_1 \hat{f}}{(z-1)} z = K_2 f + \frac{K_1 f}{(z-1)} z$$
$$\left(z + K_2 - 1 + \frac{K_1}{(z-1)} z\right)\hat{f} = \left(K_2 + \frac{K_1}{(z-1)} z\right) f$$

$$\frac{\hat{f}}{f} = \frac{\left(K_2 + \frac{K_1}{(z-1)} z\right)}{\left(z + K_2 - 1 + \frac{K_1}{(z-1)} z\right)} \quad \text{(Equation 10)}$$
$$\frac{\hat{f}}{f} = \frac{(K_2(z-1) + K_1 z)}{((z + -1 + K_2)(z-1) + K_1 z)}$$
$$\frac{\hat{f}}{f} = \frac{(K_2 z - K_2 + K_1 z)}{(z^2 + (-2 + K_2)z + 1 - K_2 + K_1 z)}$$
$$\frac{\hat{f}}{f} = \frac{((K_1 + K_2)z - K_2)}{(z^2 + (K_1 + K_2 - 2)z + 1 - K_2)}$$
$$H_P(z) = \frac{((K_1 + K_2)z^{-1} - K_2 z^{-2})}{(1 + (K_1 + K_2 - 2)z^{-1} + (1 - K_2)z^{-2})}$$

Further, a Z-transform process for the $H_E$ is represented by Equations (11) and (12).

$$H_E(z) = \frac{\left\{\begin{array}{c} K_6 + (K_5 + K_1K_6 + K_2K_6 - 2K_6)z^{-1} + \\ (K_4 + K_1K_5 + K_2K_5 - 2K_5 + K_6 - K_2K_6)z^{-2} + \\ (K_1K_3 + K_2K_3 + K_1K_4 + K_2K_4 - 2K_4 + K_5 - K_2K_5)z^{-3} + \\ (K_4 - K_2K_4 - K_2K_3)z^{-4} \end{array}\right\}}{1 + (K_1 + K_2 - 2)z^{-1} + (1 - K_2)z^{-2}}$$  Equation (11)

$$c_l[k-2] = K_6\tilde{f}_l[k] + K_5\tilde{f}_l[k-1] + K_4\tilde{f}_l[k-2] + K_3\hat{f}_l[k-2]$$  Equation (12)

$$c_l[k-2] = K_6\tilde{f}_l + K_5\tilde{f}_l z^{-1} + K_4\tilde{f}_l z^{-2} + K_3\hat{f}_l z^{-2}$$

$$\frac{c_l[k-2]}{\tilde{f}_l} = K_6 + K_5 z^{-1} + K_4 z^{-2} + \frac{K_3 \hat{f}_l z^{-2}}{\tilde{f}_l}$$

$$H_E = K_6 + K_5 z^{-1} + K_4 z^{-2} + K_3 z^{-2} H_p$$

$$H_p(z) = \frac{((K_1 + K_2)z^{-1} - K_2 z^{-2})}{(1 + (K_1 + K_2 - 2)z^{-1} + (1 - K_2)z^{-2})}$$

Figure 5:
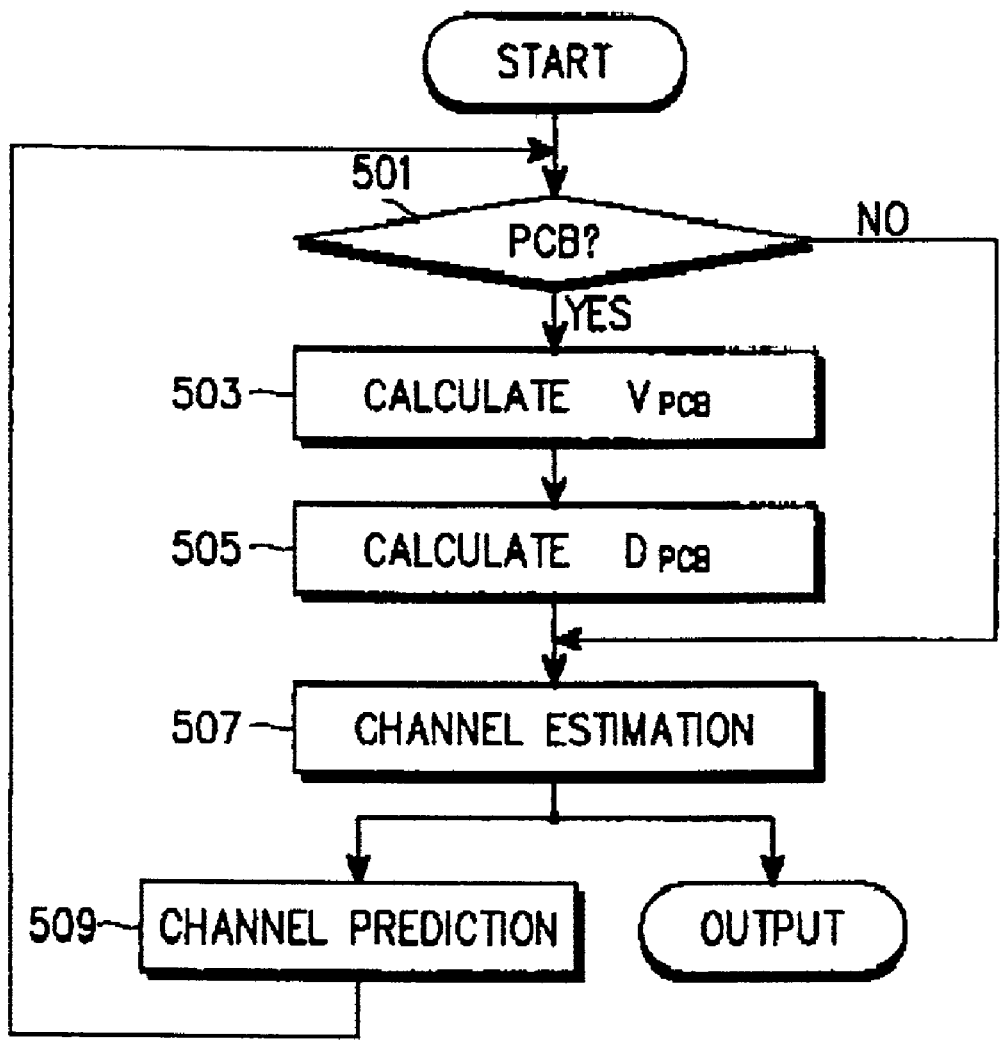
FIG. 5 illustrates a control process of the channel estimator according to a preferred embodiment of the present invention.

FIG. 5 illustrates a control process of the channel estimator according to a preferred embodiment of the present invention. An operation of the channel estimator according to an embodiment of the present invention will be described in detail with reference to FIG. 5.

Referring to FIG. 5, the channel estimator first receives a signal on a traffic channel after a time delay, determines a predicted value for the channel, and acquires a channel-compensated signal. In this process, the channel estimator can detect PCB duration where a power control bit is received. Therefore, the channel estimator according to the present invention determines in step 501 whether a power control bit (PCB) is received. That is, the channel estimator detects a power control bit in a predicted duration. Upon receiving signals exclusive of a power control bit, the procedure proceeds to step 507. Upon failure to receive the power control bit, the channel estimator operates the received signal as a channel estimator. However, upon receiving a power control bit, the channel estimator calculates $V_{PCB}$ in step 503. The VPCB is calculated by the soft-decision processor 400 using Equation (3). Thereafter, the channel estimator calculates the $D_{PCB}$ in step 505. The $D_{PCB}$ is also calculated by the soft-decision processor 400 using Equation (4). After calculating the $V_{PCB}$ and the $D_{PCB}$, the channel estimator functions as a channel estimator by the FIR filter 300 in step 507. That is, in step 507, the multi-symbol averaging FIR filter 300 sums up the received multiple symbols and outputs the summed signal.

In a decision directed mode, the power control bits are decoded to compensate the code, and the compensated result is provided to the channel estimator. In addition, the channel estimator is implemented to have fixed input, output and internal operation points.

Further, the channel estimator deduces the channel-estimated value. In step 509, the channel-estimated value is provided to the predictor 200. The predictor 200 then performs a prediction operation using the channel-estimated value. After calculating the predicted value using the predictor 200, the channel estimator returns to step 501 and uses the predicted value for the next input symbols.

Figure 6:
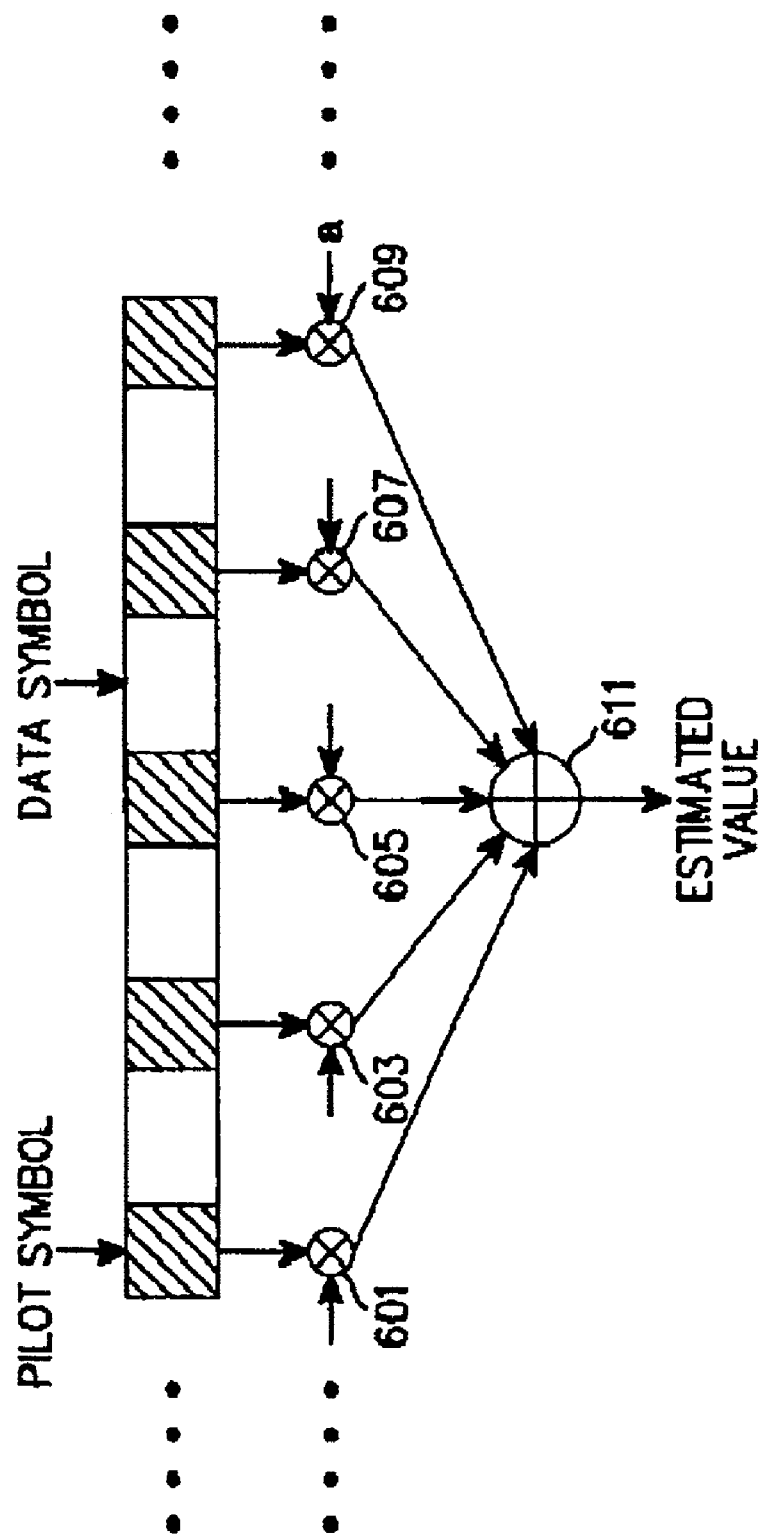
FIG. 6 illustrates a structure of a WMSA (Weighted Multi-Slot Averaging) filter applied to the exiting channel estimator.

FIG. 6 illustrates a structure of a WMSA (Weighted Multi-Slot Averaging) filter applied to the exiting channel estimator. With reference to FIG. 6, a description will be made as to how the WMSA filter is applied to the present invention in a mobile communication system receiving a pilot signal and a power control signal with power control bits among the bits in a predetermined period of a bit stream of the pilot signal. The WMSA filter illustrated in FIG. 6 reads 5 pilot symbols and the power control signal, sums up the read pilot symbols by a summer 611 and calculates an average of them, thereby generating an estimated value. In this process, the WMSA filter has a necessary duration. An increase in the duration contributes to an improvement in the performance. However, the increase in the duration leads to an increase in time delay in reading and estimating the pilot symbols, so it is preferable to select an optional value for the duration.

As described above, the CDMA-2000 system and the WCDMA (Wideband CDMA) system estimate a channel by simply reading and predicting input symbols without converting the input symbols to completely different signals. Therefore, it is possible to perform channel estimation through a simple modification of the algorithm without a modification of the hardware. The channel estimator according to the present invention can be applied not only to a CDMA-2000 reverse link receiver but also to a WCDMA reverse link receiver, without a modification of the hardware structure. In addition, the new channel estimator has excellent channel estimation capabilities in a high-speed fading environment.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel estimation apparatus for estimating a radio channel environment by multiplying a currently received bit signal of a pilot signal and previously received bit signals by weights, and summing the weighted currently received bit signal and the weighted previously received bit signals in a CDMA (Code Division Multiple Access) mobile communication system receiving the pilot signal comprised of a stream of bits having given bit values, comprising:

a predictor for generating a predicted bit signal indicating a bit signal to be received next using a difference between a currently received bit signal and a predicted bit signal which is obtained by predicting currently received bit from a received bit prior to the currently received bit; and a summer for summing the predicted bit signal from the predictor, the weighted currently received bit signal and the previously received bit signals.

2. The channel estimation apparatus as claimed in claim 1, further comprising a delay for matching time delay of the output of the predictor to time delay of the currently received bit signal.

3. The channel estimation apparatus as claimed in claim 1, wherein the predictor comprises:
an adder for calculating a difference between the currently received bit signal and an output signal of the predictor generated from the previously received bit signal;
at least two amplifiers for amplifying an output signal of the first adder with different weights;
a first delay-adder for adding an output of a first amplifier among the amplifiers to a first signal, and delaying the added signal thereby to generate the first signal; and
a first adder for adding an output of the first delay-adder to an output of the other amplifier.

4. The channel estimation apparatus as claimed in claim 3, wherein the predictor comprises:
a delay for delaying an output of the first adder for a predetermined time; and
a second delay-adder for adding an output of the delay to a second signal and delaying the added signal thereby to generate the second signal.

5. A channel estimation apparatus for estimating a radio channel environment by multiplying a currently received bit signal of a pilot signal and previously received bit signals by weights, and summing the weighted currently received bit signal and the weighted previously received bit signals in a CDMA (Code Division Multiple Access) mobile communication system receiving the pilot signal comprised of a stream of bits having given bit values, and a power control signal comprised of power control bits, comprising:
a power control bit (PCB) extractor for receiving the bit stream and extracting positions of the power control bits from the received bit stream;
a switch for outputting a signal for removing the power control bits from the bit stream and outputting the intact pilot signal at an initial point when the bit stream is received, and outputting an output of a soft-decision processor in the power control bit positions of the bit stream when the soft-decision processor is stabilized;
a multiplier for multiplying an output signal of the switch by the bit stream;
the soft-decision processor for deciding a maximum ratio by receiving an output signal of the multiplier and the power control bit signal, and providing the switch with a soft-decided value using the decided maximum ratio; and
a summer for summing the weighted currently received bit signal and the weighted previously received bit signals.

6. The channel estimation apparatus as claimed in claim 5, wherein the soft-decision processor comprises:
a conjugator for generating a conjugated value for an output signal of the multiplier;
a mixer for mixing an output of the PCB extractor with an output of the conjugator;
a real-part extractor for extracting a real part from an output of the mixer;
a maximum ratio decider for determining a maximum ratio among the output of the real-part extractor; and
a soft-decision device for soft-deciding an output value of the maximum ratio decider and outputting a soft-decided coefficient.

7. A channel estimation apparatus for estimating a radio channel environment by multiplying a currently received bit signal of a pilot signal and previously received bit signals by weights, and summing the weighted currently received bit signal and the weighted previously received bit signals in a CDMA (Code Division Multiple Access) mobile communication system receiving the pilot signal comprised of a stream of bits having given bit values, and a power control signal comprised of power control bits, comprising:
a power control bit detector for detecting a power control bit from the bit stream that was subject to preprocessing;
a mixer for mixing the preprocessed pilot signal with an output signal of a switch;
a first filter for summing a pilot symbol output form the mixer and at least 2 previous pilot symbols preceding the pilot symbol;
a soft-decision processor for calculating a soft-decided value for the pilot signal from the output of the power control bit detector; and
the switch for selectively switching an output of the soft-decision processor, information allowing the channel estimator to discard the bit stream, or information allowing the channel estimator to output the intact bit stream.

8. The channel estimation apparatus as claimed in claim 7, wherein the first filter is an FIR (Finite Impulse Response) filter.

9. The channel estimation apparatus as claimed in claim 8, wherein the first filter comprises a predictor comprised of an HR (Infinite Impulse Response) filter.

10. The channel estimation apparatus as claimed in claim 9, wherein the first filter comprises:
a first delay for primarily delaying a signal output from the mixer;
a second delay for secondarily delaying an output signal of the first delay;
a first amplifier for amplifying the signal output from the mixer by a given gain;
a second amplifier for amplifying the output of the first delay by a given gain;
a third amplifier for amplifying an output of the second delay by a given gain;
a predictor for predicting a value to be received next using the signals output from the mixer;
a third delay for delaying an output of the predictor as much as an output of the second delay;
a fourth amplifier for amplifying an output of the third delay by a given gain; and
a summer for summing outputs of the first to fourth amplifiers.

11. The channel estimation apparatus as claimed in claim 9, wherein the predictor comprises:
a first adder for calculating a difference between the signal output from the mixer and an output signal of the predictor generated from a previously received signal;
first and second amplifiers for amplifying an output value of the first adder by gains;
a second adder for adding an output of the first amplifier to a first signal;
a first delay for delaying an output of the second adder and outputting the first signal;
a third adder for adding the output of the second adder to an output of the second amplifier;
a second delay for delaying an output of the third adder;
a fourth adder for adding the output of the second adder to a second signal; and
a third delay for delaying an output of the fourth adder and outputting the second signal.

12. The channel estimation apparatus as claimed in claim 7, wherein the soft-decision processor comprises:
- a conjugator for receiving a value predicted by the first filter and calculating a conjugate value for the predicted value;
- a mixer for mixing the power control bit with the calculated conjugate value from the conjugator;
- a real-part extractor for extracting a real part from an output of the mixer;
- a maximum rate combiner for comparing weights of output signal of the real-part extractor and weighted-combines the signals; and
- an average calculator for calculating an average value from outputs of the maximum rate combiner.

13. A channel estimation method in a mobile communication system, comprising the steps of:
- calculating an average value of input signals received through multiple paths by detecting a power control bit;
- calculating a soft-decided value for the remaining control bits except pilot bits; and
- estimating a channel using the calculated soft-decided values,
- wherein the average value and the soft-decided value are respectively calculated by $$V_{PCB} = \sum_{i=0}^{L-1} \text{Re}\left(\left(f_i[k]\hat{f}^*[k]\right)\right)$$

$$D_{PCB} = \begin{cases} 1 & \text{if } V_{PCB} \geq 0 \\ -1 & \text{otherwise} \end{cases}$$

14. The channel estimation method as claimed in claim 13, further comprising the step of estimating a state of the channel using the channel-estimated value.

15. A channel estimation method for estimating a radio channel environment by multiplying a currently received bit signal of a pilot signal and previously received bit signals by weights, and summing the weighted currently received bit signal and the weighted previously received bit signals in a CDMA (Code Division Multiple Access) mobile communication system receiving the pilot signal comprised of a stream of bits having given bit values, and a power control signal comprised of power control bits, comprising the steps of:
- predicting a next bit signal succeeding the currently received bit signal, multiplying the predicted next bit signal by a weight, and generating a weighted next bit signal; and
- summing the weighted next bit signal, the weighted currently received bit signal and the previously received bit signals.

16. The channel estimation method as claimed in claim 15, further comprising the step of matching time delay of an output of a predictor to time delay of the weighted next bit signal.

17. The channel estimation method as claimed in claim 15, wherein the prediction step comprises the steps of:
- (a) calculating a difference between the currently received bit signal and an output signal of the predictor;
- (b) amplifying the difference by a first gain;
- (c) amplifying the difference by a second gain;
- (d) adding the result of step (b) to a previous result of step (b);
- (e) adding the result of step (d) to the result of step (c);
- (f) delaying the result of step (e) for a predetermined time; and
- (g) adding the result of step (f) to a previous result of step (f).

18. The channel estimation method as claimed in claim 15, further comprising the steps of:
- extracting a power control bit from the power control signal containing the pilot signal;
- mixing a conjugated value for the weighted next bit signal from the predictor with the extracted power control bit, subjecting the mixed value to maximum ratio combining (MRC), and soft-deciding the MRC-combined value;
- selecting one out of a first control signal for removing the power control bit and a second control signal for sampling an original signal according to a coefficient value from a soft-decision processor or a state of a sample; and
- mixing an output of a switch with the power control signal, and providing the mixed signal to the predictor.

19. The channel estimation apparatus as claimed in claim 18, wherein the step of outputting the soft-decided coefficient value comprises the steps of:
- (a) calculating a conjugate value of the weighted next bit signal from the predictor;
- (b) mixing the power control bit with the calculated conjugate value;
- (c) extracting a real part from the result of step (b);
- (d) determining a maximum rate value among output values of a real-part extractor; and
- (e) soft-deciding a coefficient value from the result of step (d) and outputting the soft-decided coefficient value.

* * * * *